April 21, 1953　　　　W. W. CARSON, JR　　　　2,635,636
PILOT-OPERATED VALVE
Filed Oct. 10, 1949　　　　　　　　　　　2 SHEETS—SHEET 1
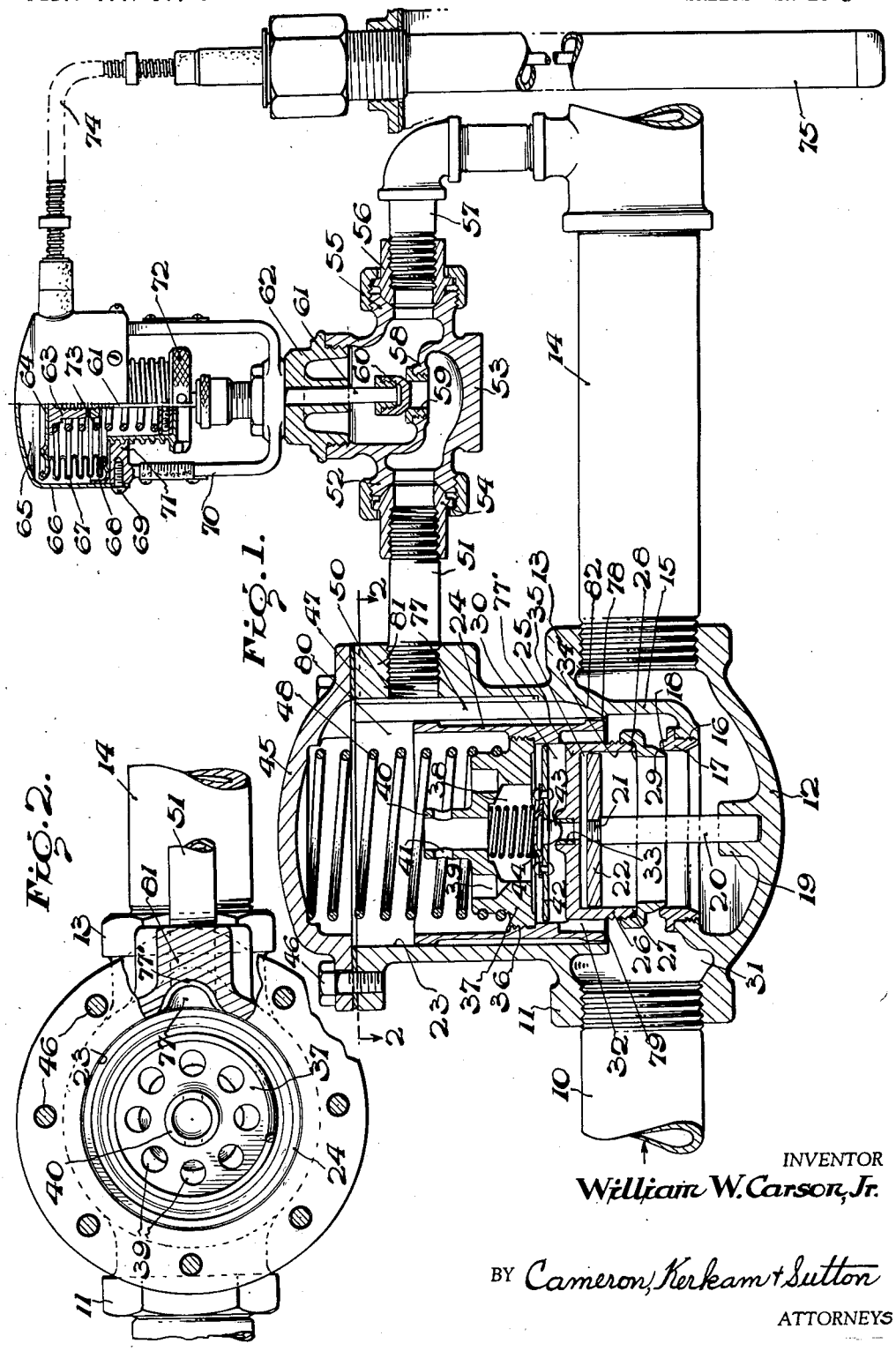
INVENTOR
William W. Carson, Jr.
BY Cameron, Kerkam & Sutton
ATTORNEYS

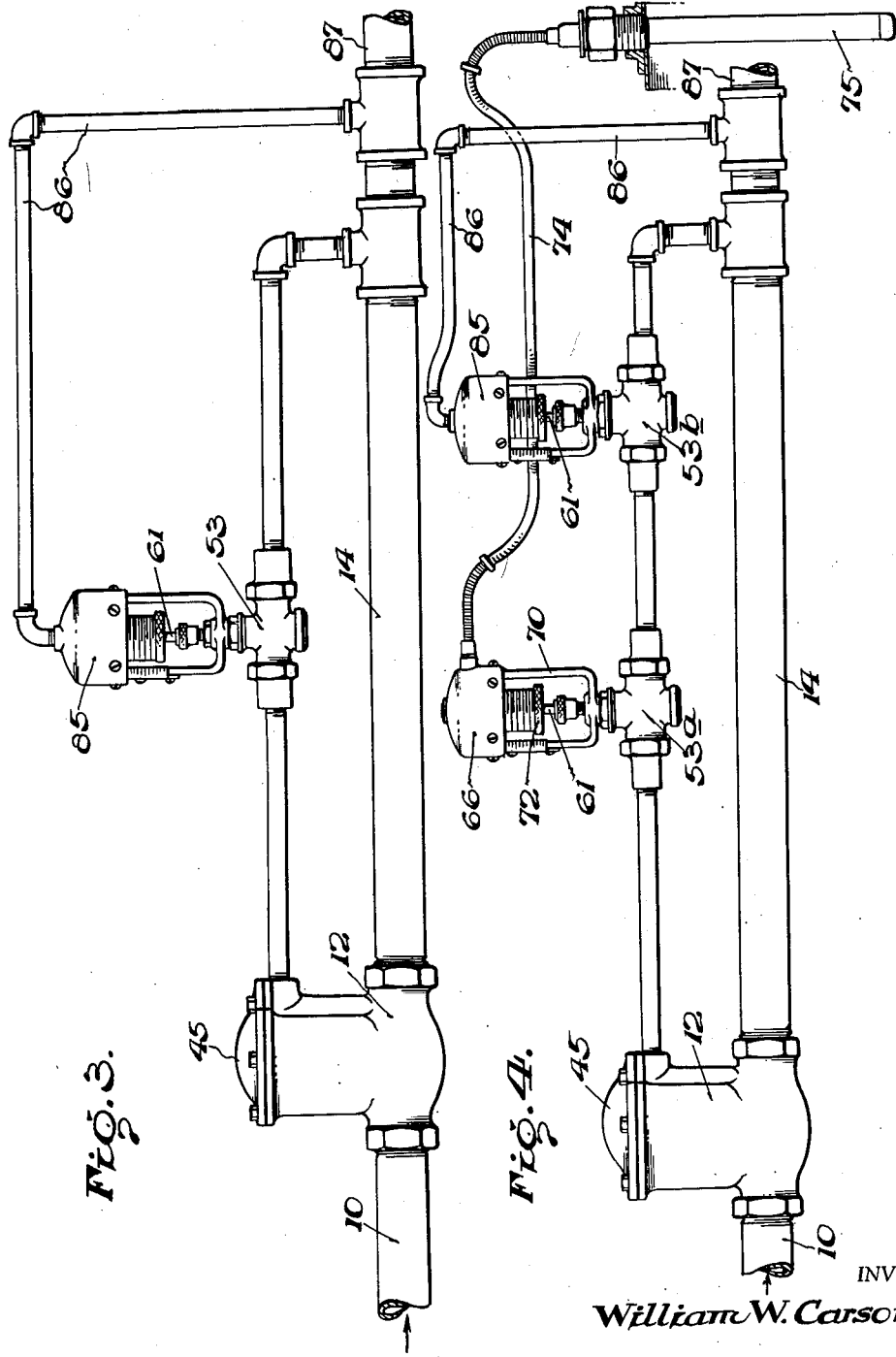

Patented Apr. 21, 1953

2,635,636

UNITED STATES PATENT OFFICE 2,635,636

PILOT-OPERATED VALVE

William W. Carson, Jr., Knoxville, Tenn., assignor to Robertshaw-Fulton Controls Company, Knoxville, Tenn., a corporation of Delaware Application October 10, 1949, Serial No. 120,429

8 Claims. (Cl. 137—662)

This invention relates to pilot operated valves, and more particularly to a pilot operated valve wherein the main valve may be caused to assume predetermined intermediate positions between wholly closed and wide open positions under the control of a temperature or pressure actuated pilot valve.

Pilot operated valves as heretofore proposed are generally characterized by a main valve operatively connected to a piston or a diaphragm which is subjected to a fluid pressure derived from the fluid at the up-stream side of the main valve, as by leakage through a fixed orifice, while the magnitude of said pressure acting on said piston or diaphragm is regulated by a pilot valve operating as a variable orifice to build up or release said pressure acting of said piston or diaphragm. Conversely, admission of upstream pressure to the effective face of the piston or diaphragm may be controlled by the pilot valve and leakage through a fixed orifice may exist to the downstream side of the main valve. In either event valves of this character as heretofore proposed are highly unstable because of the sensitivity of the response of the piston or diaphragm to slight variations in the pressure acting thereon, whereby the main valve moves between fully closed and wide open positions in response to such changes in effective pressure acting on the piston or diaphragm as can be derived from thermosensitive or pressure sensitive devices available to control the pilot valve. Before the main valve can assume an intermediate position in such a structure, there must be an exceedingly close balance between the difference in the fluid pressures acting in opposition on the piston or diaphragm and the effects of the inflow and outflow of pressure fluid through the fixed and variable orifices, an operation which in turn would require a microscopically exact positioning of the pilot valve in order properly to predetermine the size of the variable orifice as required to maintain such a balance. Such precision of adjustment is not practicable with pilot valves under the control of commercially available thermosensitive and pressure sensitive actuating mechanisms. Furthermore with thermostatic regulation of the pilot valve variations in the downstream pressure acting on the main valve or its piston or diaphragm tends to upset the balance of forces, as does also the velocity effects of the fluid flow past the main valve, which effects vary with the volume of fluid flowing past the main valve.

It is an object of this invention to provide an improved pilot operated valve which is so constructed that the main valve may be caused to assume and maintain predetermined intermediate positions between wide open and fully closed positions.

Another object of this invention is to provide an improved device as characterized which permits balancing out of the downward thrust of the supply pressure over the area of the main valve port.

Another object of this invention is to provide an improved device as characterized which nullifies the effect of varying downstream pressures and largely, if not completely, eliminates velocity effects on valve operation due to fluid passing through the main valve port.

Another object of this invention is to provide an improved device of the type characterized which includes an auxiliary pressure operated valve operable to balance out undesired forces at the proper point in the operating cycle.

Another object of this invention is to provide an improved device of the type characterized which may be sensitively actuated by a thermostatic control or a pressure responsive control, or both, to predetermine the extent of incremental opening of the main valve.

Another object of this invention is to provide an improved device of the type characterized which is highly sensitive and accurate in operation so that it may be used, whether under the control of a thermostat or a pressure responsive device or both, to predetermine accurately the rate of flow of fluid provided by the main valve.

Another object of this invention is to provide an improved device of the type characterized which is simple in construction, composed of parts which are relatively inexpensive to manufacture and assemble, and highly efficient in operation.

Other objects of the invention will appear as the description of the invention proceeds.

The invention is capable of receiving a variety of mechanical expressions certain of which are illustrated on the accompanying drawings, but it is to be expressly understood that the drawings are for purposes of illustration only and are not to be construed as definitions of the limits of the invention, reference being had to the appended claims for that purpose.

Referring in detail to the drawings wherein like reference characters are employed to designate corresponding parts in the several figures, Fig. 1 is an elevation partly in section of an embodiment of the present invention wherein the pilot valve is under thermostatic control;

Fig. 2 is a section on the line 2—2 of Fig. 1;

Fig. 3 is a schematic elevation illustrating an embodiment of the invention wherein the pilot valve is under the control of a pressure operated device; and Fig. 4 is a schematic elevation illustrating an embodiment of the invention provided with two pilot valves respectively controlled by temperature responsive and pressure responsive devices.

Referring first to the embodiments of Figs. 1 and 2, 10 designates any suitable inflow or upstream conduit for a medium to be controlled, such as steam, and suitably connected, as by threading, to the inlet nipple 11 of a main valve casing 12. Casing 12 is also provided with an outlet nipple 13 into which is suitably connected, as by threading, the outflow or downstream conduit 14. Interiorly the valve casing 12 is provided with a suitable partition 15, here shown as having a threaded opening 16 in which is threadedly mounted a valve seat 17 of any suitable construction to provide a valve port 18. The wall of the valve casing 12 opposite the valve port 18 has a centrally apertured boss 19 in which is loosely socketed a stem 20 that carries at its opposite end, as by the threaded connection 21, a disk 22 constituting a stationary piston whose effective area is substantially the same as the effective area of the valve port 18.

The wall of the valve casing 12 in axial alignment with the valve port 18 is constructed to provide a cylinder 23. Slidably mounted in said cylinder 23 is a piston 24 of generally tubular formation having integrally formed thereon or suitably attached thereto a transverse portion 25 that has a downwardly extending cylindrical skirt 26, here shown as exteriorly threaded at 27 and carrying an annular valve member 28 of any suitable construction to provide a seating portion 29 for cooperation with the valve seat 18. Thereby valve member 28 moves as a unit with piston 24. Piston 24 has a clearance from the inner wall of cylinder 23 due to mechanical limitations, through which fluid may leak into the cylinder 23 from the upstream side of valve port 18.

Portion 25 of said piston also constitutes the end wall of a cylinder 30 which is in communication with the chamber 31 at the upstream side of the valve port 18 through one or more passages 32 formed in the wall of the piston 24. Portion 25 also has a port 33 extending therethrough and in which may be disposed a suitable valve seat member as illustrated. The inner face 34 of the skirt 26, together with the under face of the portion 25 of the piston 24, provides a cylinder 35 in which is disposed the aforesaid stationary piston 22, the latter having a sliding clearance with the inner face 34 of the skirt 26 that affords a means comparable to a fixed orifice whereby pressure in the cylinder 35 may be dissipated to the downstream side of the valve port 18.

Piston 24 has a threaded portion 36 in which is threadedly received block 37 whose under face provides the upper end wall of the before referred to cylinder 30. Block 37 has a centrally arranged recess 38 which is in communication through one or more passages 39 in the body of said block with the space in cylinder 23 above piston 24. Block 37 is also illustrated as having a centrally arranged tubular extension 40 having aligned spanner openings 41 which may be used in adjusting the position of the block 37 and also may be used in rotating the piston 24 with its valve member 28 to grind it to its valve seat 29.

Mounted in the cylinder 30 is a piston 42 in the form of a disk, and mounted on said piston 42 at the central portion thereof for opening and closing the port 33 is an auxiliary valve member 43. Mounted in the recess 38 in the block 37, and reacting between the end wall of said recess and the piston 42, is a coil spring 44 which normally holds the valve member 43 in position for closing the port 33. Reacting between the block 37 and a cover 45, which may be secured to the end of the valve casing 12 in any suitable way as by bolts or screws 46, with interposed packing 47 if preferred, is a coil spring 48 of greater tension than coil spring 44. As shown, spring 48 is attached to the block 37, so as to form a unit therewith to facilitate assembly and disassembly, but such is not essential as the coil spring 48 could be separately installed to react between the cover 45 and any suitable spring centering surface on piston 24.

While the pilot valve mechanism next to be described may conveniently be made a unitary part of the main valve structure by providing a pilot valve port in the wall of the casing 12 or a suitable partition formed therein, it is preferred in the interest of flexibility of installation and manufacturing simplicity to provide the pilot valve mechanism as a separate unit. In the form shown the cylinder 23 has an aperture 50 provided in the wall thereof at any suitable location, and mounted in said aperture, as by screw threaded connection, is a section of conduit 51 of any suitable length connected to the inlet nipple 52 of a pilot valve housing 53 as by the gland illustrated at 54. Outlet nipple 55 of pilot valve housing 53 has connected thereto in any suitable way, as by the gland 56, a section of conduit 57 connected into the downstream or outflow conduit 14 at any suitable location, so that fluid passed by the pilot valve will be returned to the outflow conduit 14. Pilot valve housing 53 has an interior partition 58 provided with any suitable valve seat member 59 with which cooperates a pilot valve member 60 of any suitable construction. By preference the pilot valve member 60 has a conical seating portion cooperating with the port of the valve seat member 59 for predeterminately controlling the flow of fluid through said port as the seating portion of the pilot valve member 60 is moved with respect to said port.

In the form shown in Fig. 1, a stem 61 operatively connected to the pilot valve member 60 extends through the bonnet 62 of valve housing 53 and is suitably connected to a thermostat of any appropriate size, type and construction for the purpose of varying the position of the pilot valve member 60 in conformity with the temperature requirements of the medium to which the thermostat is subjected. In the form shown, the stem 61 is operatively connected as by threading to an interiorly threaded socket member 63 formed on or carried by the movable end wall 64 of an expansible and collapsible chamber or motor vessel 65 whose exterior wall is formed by a rigid cup-shaped member 66 and whose interior flexible wall 67 is shown as in the form of an expansible and collapsible corrugated tubular wall or bellows hermetically sealed at its opposite ends to said movable end wall 64 and a stationary annular wall 68 sealed to said cup-shaped wall 66 interiorly thereof and adjacent the open end of said cup-shaped wall. Said cup-shaped wall is mounted in any suitable way as by screws 69, on a bracket 70 carried by the bonnet 62 of the pilot valve housing 53. Bracket 70 includes an interiorly threaded annular member 71 in which is threadedly adjustable a spring seat 72. Reacting between said spring seat 72 and the movable end wall 64 of said motor vessel 65 is a coil spring 73 for predetermining the pressure which must exist in chamber 65 to effect predetermined movements of the pilot valve stem 61 in one direction or the other. Communicating with the chamber 65 and connected thereto in any suitable way is a conduit 74 of any suitable length, which may be rigid or flexible in construction, said conduit 74 at its opposite end being connected in any suitable way to a bulb 75 adapted to be charged with any suitable thermosensitive medium and operable to expand and contract the chamber 65 with variations of temperature at the bulb 75. As the thermostat illustrated is a well known construction further detailed description thereof is deemed to be unnecessary.

In conformity with the present invention the wall of the cylinder 23 is provided with a contoured groove 77 which extends from a point 78 just beneath the location of the lowermost point 79 of the skirt of piston 24 when the latter is in its lowermost position, with the valve member 28 closing the port 29, to a point at least as high as the uppermost position of the extremity 79 of said skirt when the piston 24 is in its uppermost position. Grooves 77 may be abruptly enlarged as at 77' above the upper position of the bottom end of piston 24 to obtain better valve response. Groove 77 is in open communication at its upper extremity with the chamber 80 within the cylinder 23, while its lowermost extremity is in a position to communicate with the chamber 31 containing the upstream pressure as soon as the piston 24 starts to move to uncover the lower extremity of said groove 77. Groove 77 preferably increases in cross section progressively from its lowermost extremity to a point at or adjacent to the location of the lowermost edge 79 of the skirt of the piston 24 when the latter is in its uppermost position, and said groove may be contoured in any suitable way so as to provide the desired increase in cross section and therefore the predetermined rate of flow of pressure fluid from chamber 31 to chamber 80 as the piston 24 moves upwardly to uncover successive portions of said groove 77. As illustrated, the groove 77 has a generally semicylindrical shape 81 at its upper extremity, as shown by the cross section of Fig. 2, and this cross section is smoothly merged into a cross section of paraboloidal contour at the lower extremity as shown at 82. This particular contour is preferred when using a pilot valve having a conical seating portion because the main valve member 28 is thereby caused to move at approximately the same ratio as the pilot valve member 60, but the contour of said pilot valve may be other than conical in order to obtain the desired response of main valve member 28 to a predetermined opening or closing movement of pilot valve member 60 for a given contour of groove 77, while said groove may be variously contoured to obtain desired ratios of movement between the main valve member and the pilot valve member. Thus by making the lower extremity of the groove 77 of conical cross section, and using a conically-shaped pilot valve member 60, magnified lifting movements of the piston 24 will be produced during the lower part of its stroke and reduced lifting movement will be produced in the upper part of its stroke. In general, enlarging the cross sectional area of the lower end of said groove 77 tends to reduce the amount of movement of the piston 24 per increment of groove uncovered because an increased cross section increases the flow of fluid from chamber 31 to chamber 80 per increment of movement of the piston 24.

Assume that the parts are in the relative position shown in Fig. 1, the temperature at the bulb 75 being such that pilot valve member 60 closes the port 59, and main valve member 28 being in seating contact with member 17 to close the port 29. Fluid of upstream pressure exists in chamber 31 and leaks between the piston 24 and the cylinder 23, and through the lower end of groove 77, until the pressure within the chamber 80 interiorly of cylinder 23 is substantially the same as in chamber 31. Main valve member 28 is then held on its seat 17 by the weight of the piston 24 and parts carried thereby, by the thrust of the spring 48 and by the fluid pressure in chamber 80 acting on the unbalanced area of the piston 24, which area is substantially equal to the area of the port 29.

Now assume that cooling of the bulb 75 causes the pilot valve member 60 to be lifted a short distance. Fluid may now flow from the chamber 80 through pilot valve casing 53 to the outlet or downstream conduit 14, causing a reduction of pressure in the chamber 80. When this drop of pressure reaches a predetermined value, a one pound per square inch drop of pressure being convenient for most purposes, a differential pressure exists on the piston or plate 42 sufficient to overcome the tension of the spring 44, because cylinder 30 is subjected through passages 32 to the upstream pressure existing in chamber 31, while the rear or upper face of the plate 42 is subjected to the pressure in the chamber 80 through apertures 39 and recess 38. Thereby plate or piston 42 is lifted by this differential pressure until it seats against the under face of the block 37, this lifting movement of the plate or piston 42 causing the valve member 43 to open the port 33 and close recess 38. Upstream pressure now flows through the passages 32, cylinder 30 and port 33 into the cylinder 35, also acting on the under face of the auxiliary valve member 43 to accelerate the upward movement of the plate or piston 42 with a snap like action as soon as the port 33 is opened. The full upstream pressure of the fluid now exists in the cylinder 35, acting downwardly on the stationary piston 22 and upwardly on the under face of the bottom portion 25 of piston 24 in chamber 30. In other words, the lower portion 25 of the piston 24 is now subjected at its opposite faces to nearly the same pressures, to wit, the pressures existing in the cylinders 30 and 35, while the previously unbalanced downward force acting on the piston 24 due to the fluid pressure in the chamber 80, acting on an unbalanced area of the piston 24 substantially equal in area to the port 29, is now cancelled out, the unbalanced pressure now being carried only by the stationary piston 22.

It will thus be observed that the initial opening of the pilot valve member 60 has resulted, through operation of the auxiliary valve member 43, in the cancellation of the unbalanced upstream pressure on the piston 24 as a major force in holding the main valve member 28 on its seat, the auxiliary valve 43 having been opened to transfer, so to speak, the unbalanced fluid pressure previously acting on the piston 24 to the stationary piston 22. At this stage of the conditioning of the main valve, the latter is held on its seat 17 only by the weight of the piston 24 with its associated parts and the tension of the spring 48. Now a further increase in the opening of the pilot valve member 60 due to cooling at the bulb 75 results in a further reduction of pressure in the chamber 80. When this reduction in pressure reaches a predetermined amount, say two pounds per square inch, the weight of the piston 24 and the tension of the spring 48 are overcome by the differential pressure acting on piston 24, and piston 24 starts to move upwardly against the tension of the spring 48 impelled by the difference in pressure acting on the under face of the piston 24 and the pressure existing in the chamber 80, both pressures acting throughout the area of the cylinder 23.

As soon as the piston 24 begins to move upwardly it further uncovers the lower end of the groove 77, thereby permitting additional fluid to flow into the chamber 80, at a rate determined by the cross section of the groove 77 uncovered, whereby a pressure is promptly developed in said chamber sufficient to balance the upstream pressure acting on the under face of the piston 24. Thereby the piston 24 is checked in its upward movement at a very definite position which is determined by the outflow of pressure fluid from chamber 80 past pilot valve member 60 and the inflow of fluid pressure through groove 77 and the clearance around the piston 24. As soon as this balance of pressure is achieved, the piston 24 is stopped in its opening movement and held there, to maintain a predetermined flow of fluid past main valve member 28 as long as pilot valve member 60 remains stationary. If pilot valve member 60 is lifted farther away from its seat 59, however, so as to increase the outflow of pressure fluid from chamber 80, the pressure in said chamber is again reduced, and piston 24 moves upwardly to increase the rate of flow of pressure fluid through groove 77 until the point of equilibrium is again reached. Equilibrium is achieved as soon as the upward force arising from the difference between the upstream pressure acting on the under face of the piston 24 and the pressure in the chamber 80 is balanced by the downward forces consisting of the weight of the piston 24 and its attached parts and the force of the spring 48 at that particular position.

The closing cycle of the main valve is, as is apparent, the reverse of the opening cycle above explained. Increased restriction of flow past the pilot valve member 60 causes an increase of pressure within the chamber 80 whereby the piston 24 is caused to move downwardly to such an extent as to reduce the flow of pressure fluid through the groove 77 and reestablish a position of equilibrium. When the pilot valve member 60 approaches its valve seat the pressure in the chamber 80 builds up to the point where piston 24 reengages main valve member 28 with its seat 17, and plate or piston 42 is moved downwardly by the increased pressure applied to its rear face through apertures 39 and recess 38 so as to close port 33 by auxiliary valve member 43. The pressure existing in the cylinder 35 dissipates through the clearance around stationary piston 22, and the parts are restored to the position first assumed with the upstream pressure effective in holding the main valve member 28 against its seat.

Said stationary piston 22 performs a multiple function in that it not only permits balancing out the downward thrust of the upstream pressure over an area of the piston of substantially the same area as that of the port 29 when auxiliary valve 43 is opened, but it also nullifies the effect of varying downstream pressures reacting on the main valve member 28, and it largely, if not entirely, eliminates the velocity effects on the main valve member 28 due to the fluid flowing through the port 29, the stationary piston 22 shielding the piston 24 over such an area as would otherwise be exposed to downstream pressure.

It will be apparent from the foregoing explanation that the type of response of the main valve member 28 desired as a result of any given movement of the pilot valve member 60 can be nicely predetermined by the cross sectional shape and therefore the area of the groove 77 at any point from its lowermost extremity to that point which is adjacent the lower extremity 79 of the piston 24 in the uppermost position of said piston. The size and shape of said groove 77, the characteristics of the pilot valve member as the latter moves toward and away from its seat to vary the outflow of pressure fluid from chamber 80, and the characteristics of the spring 48 together cooperate to predeterminately control the amount of response of the piston 24, before equilibrium is reestablished, due to incremental movements of the pilot valve member.

While the embodiment of Fig. 1 illustrates a thermostatic control of the pilot valve, the present invention is not limited to such a construction. Thus in Fig. 3 there is illustrated diagrammatically an embodiment of the present invention, like parts being indicated by like reference characters, wherein the valve of the pilot valve mechanism 53 is controlled by a pressure responsive device diagrammatically indicated at 85 and connected by a suitable conduit 86 to the outlet or downstream conduit extending from the valve casing 12, so that the pilot valve will respond to fluctuations in downstream pressure and maintain a substantially constant reduced pressure in the downstream fluid line 87. In the embodiment of Fig. 4 two pilot valves are used, the pilot valve in casing 53a being operatively connected to a thermostat of the construction shown in Fig. 1, and the pilot valve in casing 53b being operatively connected to a pressure responsive device 85 such as illustrated in Fig. 3 and which is shown as connected by a suitable conduit 86 to the downstream line 87.

While in the embodiments of Figs. 1 and 2 the main valve has been illustrated as opening in response to decreasing temperature at the bulb 75, it will be apparent to those skilled in the art that the main valve may be caused to open to rising temperature by appropriately constructing the pilot valve mechanism so that it will open rather than close upon increasing temperatures at the bulb 75.

It will therefore be perceived that by the present invention a pilot controlled valve has been provided which can be operated by a relatively small thermostat, since the thermostat is required to operate only a relatively small pilot valve, requiring small power and short valve lift, but with the assurance that the main valve will not move from one extreme position to the other upon actuation of the pilot valve, but will assume intermediate positions to predetermine the flow past the main valve by the location given to the pilot valve by the small and sensitively acting thermostat. The pilot controlled valve of the present invention is a true modulating valve because the opening and closing movements of the main valve are restricted to gradual movements with the main valve assuming positions that conform accurately with intermediate positions of the pilot valve. Thereby the main valve may be caused to maintain predetermined intermediate positions without danger of unstable action of the main valve with resultant movement from one extreme position to another.

At the same time the present invention permits balancing out of the downward thrust of the supply pressure over an area substantially equal to that of the main valve port, it nullifies the effects of varying downstream pressures, and it largely, if not entirely, eliminates the velocity effects on valve operation due to fluid flow past the main valve member. By reason of the use of the auxiliary valve undesired forces are balanced out at the proper point in the operating cycle before opening movement of the main valve is initiated, and thereby forces tending to produce unstable action on the part of the main valve are eliminated before movement of the main valve is started. The present invention also provides a pilot valve that is highly sensitive and accurate in operation whether under the control of a thermostat or a pressure responsive device or both. Embodiments of the invention are simple to construct because of low fabricating and assembly costs, and they are susceptible to a wide variety of applications due to the efficiency and sensitiveness with which the main valve may be controlled from a relatively small pilot valve that is sensitively responsive to fluctuations in temperature or pressure.

While the embodiments of the invention illustrated on the drawings have been described with considerable particularity, it is to be expressly understood that the invention is not limited thereto as the same is capable of receiving a variety of expressions, as will now be apparent to those skilled in the art, while changes may be made in the details of construction, arrangement, proportions, size, etc., parts may be replaced by equivalent parts, etc., all without departing from the present invention. Reference is therefore to be had to the appended claims for a definition of said invention.

What is claimed is:

1. In a pilot operated valve, including a main valve casing having a ported valve seat therein, the casing including a cylinder, a main valve member for cooperation with the valve seat, a piston slidable in the cylinder and providing a clearance with the wall of the cylinder, the piston being operatively connected to the main valve member and the cylinder being in communication through the clearance with the upstream side of the valve casing, and resilient means cooperating with the piston to oppose lifting of the piston until a differential pressure of predetermined magnitude exists on opposite walls of the piston, a cylinder formed in the piston communicating with the ported valve seat and of substantially the same area thereof, a stationary piston in said last named cylinder and means for mounting the same in the wall of the valve casing, means for admitting upstream pressure to said last named cylinder including a port in the wall of said last named cylinder, passages in said piston communicating with the upstream side of said valve casing for conveying upstream pressure to said port, an auxiliary valve member for opening said last named port upon predetermined decrease in pressure in the first named cylinder, and means including pilot valve mechanism for controlling the pressure in the first named cylinder.

2. In a pilot operated valve, including a main valve casing having a ported valve seat therein, the casing including a cylinder, a main valve member for cooperation with the valve seat, a piston slidable in the cylinder and providing a clearance with the wall of the cylinder, the piston being operatively connected to the main valve member and the cylinder being in communication through the clearance with the upstream side of the valve casing, and resilient means cooperating with the piston to oppose lifting of the piston until a differential pressure of predetermined magnitude exists on opposite walls of the piston, a pair of cylinders formed in the piston on opposite sides of a wall of the piston provided with a valve port, one of said cylinders communicating with the ported valve seat and having substantially the same area as the ported valve seat, the other of said last named cylinders being in communication with the upstream side of the valve casing, a piston mounted in said last named cylinder and having a valve member controlling said last named valve port, said last named piston being operable by the upstream pressure on a predetermined drop in pressure in the first named cylinder, a stationary piston in said cylinder communicating with said ported valve seat, means for supporting said stationary piston carried by the wall of the valve casing, and means including pilot valve mechanism for controlling the pressure in said first named cylinder.

3. In a pilot operated valve, including a main valve casing having a ported valve seat therein, the casing including a cylinder, a main valve member for cooperation with the valve seat, a piston slidable in the cylinder and providing a clearance with the wall of the cylinder, the piston being operatively connected to the main valve member and the cylinder being in communication through the clearance with the upstream side of the valve casing, and resilient means cooperating with the piston to oppose lifting of the piston until a differential pressure of predetermined magnitude exists on opposite walls of the piston, a cylinder formed in the piston communicating with the ported valve seat and of substantially the same area thereas, a stationary piston in said last named cylinder and means for mounting the same in the wall of the valve casing, a port in the wall of said last named cylinder for admitting upstream pressure to said stationary piston, a pressure actuated auxiliary valve for opening said last named port upon a predetermined decrease in pressure in the first named cylinder and means including a pilot valve mechanism for controlling the pressure in the first named cylinder.

4. In a pilot operated valve including a main valve casing having a ported valve seat therein, the casing including a cylinder, a main valve member for cooperation with the valve seat, a piston slidable in the cylinder and providing a clearance with the wall of the cylinder, the piston being operatively connected to the main valve member and the cylinder being in communication through the clearance with the upstream side of the valve casing, and resilient means cooperating with the piston to oppose lifting of the piston until a differential pressure of predetermined magnitude exists on opposite walls of the piston, a cylinder formed in the piston communicating with the ported valve seat and of substantially the same area thereas, a stationary piston in said last named cylinder and means for mounting the same in the wall of the valve casing, port means for admitting upstream pressure above said stationary piston, a pressure actuated auxiliary valve member for opening said last named port means upon a predetermined decrease in pressure in the first named cylinder, a contoured groove formed in the wall of the cylinder of progressively increasing cross section and arranged to be progressively uncovered by the movement of the piston to increase the fluid flow to the first named cylinder above the first named piston in predetermined relation to the lifting movement of the piston, and means including a pilot valve mechanism for controlling the escape of pressure from the first named cylinder.

5. In a pilot operated valve including a main valve casing having a ported valve seat therein and including a cylinder, a main valve member for cooperation with the valve seat, a piston slidable in the cylinder and providing a clearance with the wall of the cylinder, the piston being operatively connected to the main valve member and the cylinder being in communication through the clearance with the upstream side of the valve casing, and resilient means cooperating with the piston to oppose lifting of the piston until a differential pressure of predetermined magnitude exists on opposite walls of the piston, a pair of cylinders formed in the piston on opposite sides of a wall of the piston, a valve port in said wall of the piston, one of said last named cylinders communicating with the ported valve seat and having substantially the same area as the ported valve seat, the other of said last named cylinders being in communication with the upstream side of the valve casing through said last named valve port, a piston mounted in said last named cylinder and having a valve member controlling said last named valve port, said last named piston being operable by the upstream pressure and a predetermined drop in pressure in the first named cylinder, a stationary piston in said cylinder communicating with said ported valve seat, means for supporting said stationary cylinder carried by the wall of the valve casing, a contoured groove formed in the wall of the cylinder of progressively increasing cross section and arranged to be progressively uncovered by the movement of the piston to increase the fluid flow to the cylinder above the first named piston in predetermined relation to the lifting movement of the first named piston, and means including a pilot valve mechanism for controlling the escape of pressure from the cylinder.

6. A pilot actuated valve including a valve casing having an inlet and an outlet, a ported valve seat in said casing, a recessed valve member cooperable with said seat, a cylinder in said casing, a movable piston in said cylinder operatively connected to said valve member, resilient means urging said valve member toward closed position, a fixed piston extending into said recessed valve member and cooperating therewith to define an enclosed chamber, means for admitting inlet pressure to said chamber, means including a pilot valve mechanism for controlling the escape of pressure from said cylinder, and valve means responsive to the pressure in said cylinder for controlling the flow of fluid to said chamber.

7. In a pilot controlled valve as claimed in claim 6, means including a contoured groove formed in the wall of said cylinder and providing communication between said inlet and said cylinder, said groove being of progressively increasing cross section and disposed to be progressively uncovered by movement of said movable piston to increase the fluid flow to the cylinder above said movable piston in predetermined relation to the lifting movement thereof.

8. A pilot actuated valve as claimed in claim 6 wherein said cylinder pressure responsive valve means includes an actuating piston subject to inlet pressures on one side and to pressures in said cylinder on its other side, and resilient means biasing said actuating piston against the action of said inlet pressure.

WILLIAM W. CARSON, Jr.

References Cited in the file of this patent

UNITED STATES PATENTS

| Number | Name | Date |
|---|---|---|
| 1,046,236 | Wagner | Dec. 3, 1912 |
| 1,344,300 | Hennebohle | June 22, 1920 |
| 1,656,132 | Arrasmith | Jan. 10, 1925 |

FOREIGN PATENTS

| Number | Country | Date |
|---|---|---|
| 57,292 | Austria | of 1913 |